T. CHIGRIS.
RIGGING COUPLING LINK.
APPLICATION FILED MAR. 13, 1914.

1,108,337.

Patented Aug. 25, 1914.

Witnesses:
Albert J Matter
H. A. Armstrong

Inventor:
Thomas Chigris
By
J. H. Mock
Attorney

UNITED STATES PATENT OFFICE.

THOMAS CHIGRIS, OF KNAPPA, OREGON.

RIGGING COUPLING-LINK.

1,108,337.  Specification of Letters Patent.  Patented Aug. 25, 1914.

Application filed March 13, 1914. Serial No. 824,578.

*To all whom it may concern:*

Be it known that I, THOMAS CHIGRIS, a subject of the King of Greece, residing at Knappa, in the county of Clatsop and State of Oregon, have invented certain new and useful Improvements in Rigging Coupling-Links, of which the following is a specification.

My invention relates to rigging coupling-links, and has for its object to provide a coupling device for the rigging in logging operations and in those operations where a main line cable is drawn by means of a donkey engine.

A further principal object is to provide a simple economical and efficient means for connecting the main line with the haul back and with the butt chain which is adapted for attachment to the load to be hauled.

I accomplish the objects indicated by means of the structure shown in the accompanying drawing, in which—

Figure 1:
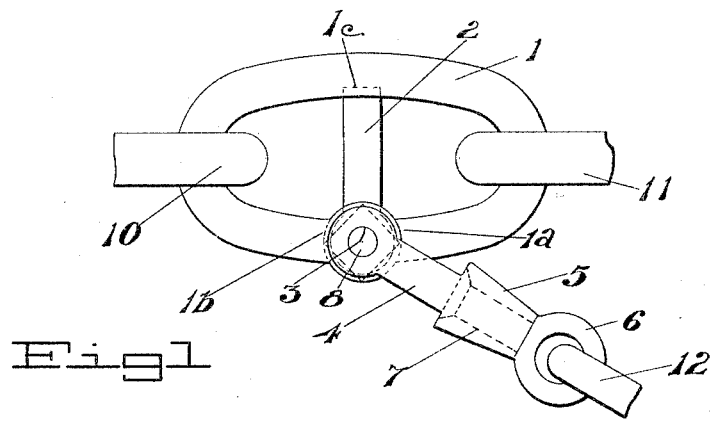
Figure 2:
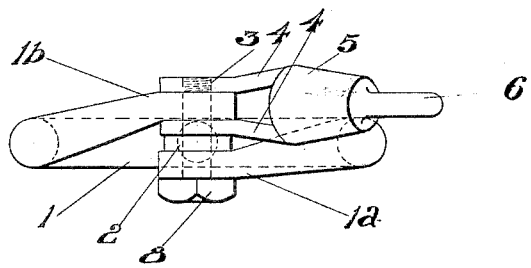
Figure 3:
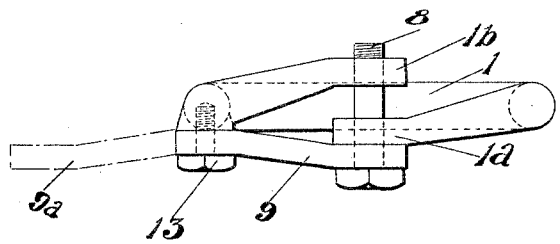

Figure 1 is a side elevation of my coupling link, showing the manner of connecting the working lines. Fig. 2 is an edge view of the link showing the open side and the means by which it is closed, also the attaching element for the haul back line. Fig. 3 is a similar view, showing a slight modification.

Describing the drawing in detail, 1 designates the body of an oblong "ring" or link, similar to the links of a log-chain, which may be made of any convenient size commensurate with the character of work to be performed. This link is divided at the median point in one of its longer sides, with the terminal portions $1^a$ and $1^b$ overlapping each other. These end portions are separated from each other laterally so as to form a split "ring" or link adapted to allow the cables 10 and 11 to be placed bodily into the link without the use of other fastening means, and without the need of inserting the cables endwise.

In suitable apertures in the end-portions $1^a$ and $1^b$ is secured the bolt 8, which serves to prevent the link from opening under the strain of operations. Upon the bolt 8 is pivotally secured the swivel 5, by means of the apertures 3 in the arms 4, and it may be secured in place by riveting thereon, or by the usual lock nut, as may be found most convenient. Upon the swivel is formed a ring 6 into which is secured the haul-back line 12.

Intermediate the end-portions $1^a$ and $1^b$ is secured a dividing bar 2 by means of an aperture at the end thereof, permitting it to be engaged over the bolt 8, the opposite end of the bar being seated in the recess $1^c$ formed in the opposite side of the body of the link 1.

By means of the structure thus described, the bolt 8 and the bar 2 may be removed when the main line may be dropped through the opening into one end of the link, and the butt-chain may be similarly positioned in the opposite end. After this the bar 2 will be set in place and the arms 4 of the swivel 5 will be placed with the apertures therein in register with those of terminals $1^a$ and $1^b$, so that upon inserting the bolt 8 the members will be securely held together, the opening of the link will thereby be closed, and the lines will be free to act in any direction with reference to each other; and the bar 2 will prevent the main line and the butt-chain from shifting to the same end, which would result in spreading the link.

In Fig. 3 is seen a slight modification in which an arm 9 is secured upon the pivot bolt 13 and is adapted to receive through an aperture in its outer end, the bolt 8, thereby acting as a stay, between which and the terminal $1^b$, the other terminal $1^a$ of the link will stand. When the members are disengaged this stay 9 is free to swing on its pivot, as indicated at $9^a$, thereby leaving the opening free to permit the passage of the cables.

The structure thus described, possesses many advantages over the usual rigging plate, among which are its economy of structure and its convenience in operation.

What I claim as new, is—

1. A rigging coupling link comprising a split ring whose ends are positioned in spaced relation, and are provided with registering apertures, a transverse bolt uniting said end portions, and a swivel connecting element pivotally mounted upon said bolt intermediate said end portions.

2. A rigging coupling-link comprising a split ring, a transverse bolt uniting the end portions thereof, a swivel connecting element pivotally secured upon said bolt, and a detachable bar for preventing intercommunication between the end-portions of the link.

3. A rigging coupling-link comprising a split ring, a transverse bolt uniting the end portions thereof, a swivel connecting element pivotally secured upon said bolt, a detachable bar for preventing intercommunication between the end-portions of the link, and a stay for supporting said transverse bolt.

In testimony whereof I affix my signature in the presence of two witnesses.

THOMAS CHIGRIS.

Witnesses:
 DAN FAHEY,
 F. E. BROOKS.

---

Copies of this patent may be obtained for five cents each, by addressing the "Commissioner of Patents, Washington, D. C."